United States Patent
Barthold et al.

(10) Patent No.: US 9,789,432 B2
(45) Date of Patent: Oct. 17, 2017

(54) FLEXIBLE LINE SEGMENT FOR THE EXHAUST SYSTEM OF AN INTERNAL COMBUSTION ENGINE

(71) Applicants: Witzenmann GmbH, Pforzheim (DE); Eberspacher Exhaust Technology GmbH & Co. KG, Neunkirchen (DE)

(72) Inventors: Jens Barthold, Pforzheim (DE); Frank Berson, Keitern (DE); Jorg Ludwig, Karlsruhe (DE); Rene Rosler, Karlsruhe (DE); Silvia Calvo, Esslingen (DE); Heike Tobben, Uhingen (DE)

(73) Assignees: Witzenmann GmbH, Pforzheim (DE); Eberspächer Exhaust Technology GmbH & Co. KG, Neunkirchen (DE)

( * ) Notice: Subject to any disclaimer, the term of this patent is extended or adjusted under 35 U.S.C. 154(b) by 437 days.

(21) Appl. No.: 13/955,716

(22) Filed: Jul. 31, 2013

(65) Prior Publication Data
US 2014/0044606 A1    Feb. 13, 2014

(30) Foreign Application Priority Data
Aug. 10, 2012    (DE) ........................ 10 2012 214 288

(51) Int. Cl.
| | |
|---|---|
| *B01D 49/00* | (2006.01) |
| *F01N 3/20* | (2006.01) |
| *F01N 13/18* | (2010.01) |
| *F16L 27/111* | (2006.01) |

(52) U.S. Cl.
CPC ........... *B01D 49/00* (2013.01); *F01N 3/2066* (2013.01); *F01N 13/1816* (2013.01); *F16L 27/111* (2013.01); *F01N 2610/02* (2013.01); *Y02T 10/24* (2013.01)

(58) Field of Classification Search
CPC ...................................................... B01D 49/00
See application file for complete search history.

(56) References Cited

U.S. PATENT DOCUMENTS

| | | | |
|---|---|---|---|
| 5,827,377 A * | 10/1998 | Crum | ..................... C22C 30/00 148/419 |
| 6,230,748 B1 | 5/2001 | Krawietz et al. | |
| 8,261,538 B2 | 9/2012 | Kistner et al. | |
| 2006/0233689 A1 * | 10/2006 | Hirata | ................... F01N 3/2066 423/235 |

(Continued)

FOREIGN PATENT DOCUMENTS

| | | |
|---|---|---|
| DE | 19641963 | 10/1997 |
| DE | 102008010071 | 8/2009 |
| DE | 102008052757 | 4/2010 |

(Continued)

*Primary Examiner* — Donald Spamer
(74) *Attorney, Agent, or Firm* — Volpe and Koenig, P.C.

(57) ABSTRACT

A flexible line segment for the exhaust system of an internal combustion engine, with an annularly corrugated or helically corrugated metallic bellows, for exhaust gas flow therethrough, and a line segment arranged upstream in reference to the metallic bellows, with a precipitation device provided in the line section, arranged upstream in reference to the metallic bellows or mounted thereat. The precipitation device is provided for urea derivatives or urea entrained in an edge layer of the exhaust gas flow from an oversaturated edge layer of the exhaust gas flow.

14 Claims, 4 Drawing Sheets

(56) References Cited

U.S. PATENT DOCUMENTS

2009/0084094 A1\* 4/2009 Goss .................. B01F 3/04049
  60/301

FOREIGN PATENT DOCUMENTS

| DE | 102011015772 | 1/2012 |
| DE | 102011112988 | 4/2012 |
| EP | 0875669 | 11/1998 |
| WO | 2012089290 | 7/2012 |

\* cited by examiner

FLEXIBLE LINE SEGMENT FOR THE EXHAUST SYSTEM OF AN INTERNAL COMBUSTION ENGINE

INCORPORATION BY REFERENCE

The following documents are incorporated herein by reference as if fully set forth: German Patent Application No. DE 102012214288.6, filed Aug. 10, 2012.

BACKGROUND

The invention relates to a flexible pipe element for the exhaust system of an internal combustion engine. Such a flexible pipe element comprises an annular corrugated or helically corrugated metallic bellows, with exhaust gas from the internal combustion engine can flow through it. A line section is arranged upstream in reference to the metallic bellows, which is also embodied flexible or inflexible, for example as a smooth tube.

Flexible pipe elements of the present type are installed in the pipe runs of exhaust systems in order to prevent transferring movements of the exhaust pipe runs, connected fixed to the internal combustion engine, to other parts of the exhaust system, which are generally fixed to the vehicle in which the internal combustion engine is installed, or perhaps connected fixed to a building in which a stationary internal combustion engine is located.

A metallic bellows is capable to compensate axial, lateral, and angular motions generated by the temperature-related changes of length, load change motions of the internal combustion engine, as well as the impact shocks occurring in vehicles during the driving motion and the like. Furthermore oscillations of most different frequencies, generated in the internal combustion engine by the moving parts and by pulsing gas flow, are compensated by the metallic bellows and thus not forwarded to the continued parts of the exhaust system to the extent the natural frequency is sufficiently damped. This prevents that the oscillations of the internal combustion engine, radiated from the exhaust system in the form of impact sound, are forwarded to a vehicle body, which otherwise would lead to undesired humming noise inside the vehicle.

Flexible pipe elements of the present type can be absolutely or practically fluid-tight by the metallic bellows used, depending if it has been produced by way of deformation of a tube or by winding a metallic profile. The metallic bellows may be embodied with one or more walls, with in case of a multi-wall embodiment the individual layers of the wall may comprise different materials, for example to promote corrosion resistance.

A flexible pipe element of the present type usually comprises, in addition to the metallic bellows, a metallic tube coaxially arranged inside thereof. This serves to guide the flow of the exhaust gas. Hereby any excessive thermal stress of the metallic bellows by the hot exhaust is prevented. Furthermore any eddying of the exhaust in the corrugations of the metallic bellows is prevented, which on the one hand would increase the flow resistance and on the other hand might cause considerable noise.

Such a metallic tube commonly represents a wound tube comprising metallic profiles or hooked profiles folded into agraffes which ensures the necessary mobility and furthermore acts in an oscillation-damping fashion due to the internal friction of the profiles against each other. If necessary, the oscillation-damping effect of the metallic tube can be reinforced by additional oscillation-damping components, such as a webbed tube pulled over the exterior of the metallic bellows or arranged between the metallic bellows and the metallic tube. Examples of such flexible pipe elements with a metallic bellows, metallic tube, and a webbed tube are also disclosed in EP 0 875 669 A2 and DE 196 41 963 C1.

Flexible pipe elements of the present type, particularly with additionally provided metallic tubes and damping elements, have successfully been used for years particularly in motor vehicles. Here, they are beneficially installed in the proximity of the engine between the exhaust manifold and the catalytic converter, because the closer the flexible line segment is arranged in reference to the rotating axis of the engine the lower the relative motions that need to be compensated by deformation. Accordingly a place of installation near the engine beneficially allows short metallic bellows of flexible line segments. Depending on the local conditions of the place of installation the cross-section is embodied either essentially cylindrical or oval or flattened like a stadium.

In order to reduce emissions of nitrous oxide from internal combustion engines, particularly diesel engines used in motor vehicles, frequently SCR-converters (Selective Catalytic Reduction Converters) are used in the exhaust system. During operation such a SCR-converter requires ammonia as reduction means for nitrous oxide ($NO_x$). The ammonia required is yielded from urea, which is injected in a liquid form upstream in reference to the SCR-converter into the hot exhaust gas flow. In the event of disadvantageous framework conditions (particularly when exhaust temperatures are too low, slow flow speeds, poor mixture of the urea with the exhaust gas flow, overdose of urea, etc.) urea derivatives form particularly in the coldest wall sections of the exhaust flow. They represent fundamental components for forming HWL-precipitations. As soon as these fundamental components and/or urea derivatives come into contact with a wall of the pipe element precipitations or viscous wall films may develop. They are directly dependent on the HWL-processing upstream in reference to the SCR-converter.

However, in many cases it is desired or even necessary in the exhaust system to install a flexible pipe element of the present type upstream in reference to a SCR-converter, while simultaneously the injection of the urea necessary for the SCR-converter occurs still upstream in reference to the flexible line segment. This can lead to disturbing precipitations of urea derivatives developing in the flexible pipe element after extended periods of operation.

Such precipitations are primarily very disadvantageous when they reach or develop in the area between a frequently provided metallic tube and the metallic bellows. Due to the fact that the metallic tube guides the exhaust flow the intermediate space between the metallic tube and the metallic bellows fails to reach temperatures sufficiently hot to dissolve the precipitations using a regeneration process or during operating conditions with particularly hot exhaust gas flow. The precipitations of urea derivatives therefore accumulate over time particularly in this intermediate space until they completely clog it at some point of time. Even in flexible line segments of the present type, in which no component is provided inside the metallic bellows with gas flown through, precipitations of urea derivatives are disadvantageous because they can precipitate at the corrugations of the metallic bellows and here are then not dissolved by hot exhaust flow because the inside of the corrugations in general it is considerably less hot than the exhaust flow. Such precipitations reduce the mobility of the metallic bellows and/or the metallic tube perhaps provided, which compromises the desired features of the flexible pipe element and, upon respective stress, can even lead to damages of the metallic bellows and the line segment then no longer showing the required fluid tightness.

SUMMARY

The present invention is therefore based on the objective of improving a flexible pipe element of the type mentioned at the outset such that the problem of precipitations of urea derivatives accumulating over time and compromising the functionality of the flexible pipe element is resolved or at least considerably reduced.

This objective is attained in a flexible pipe element with one or more features of the invention. Preferred embodiments and further developments of the line segment according to the invention are disclosed below and in the claims.

According to the invention upstream in reference to the metallic bellows, in the line section arranged here or mounted thereat, at least one precipitation device is provided for urea derivatives entrained in an edge layer of the exhaust gas flow and/or for urea, with the edge layer of the exhaust gas flow perhaps being oversaturated with it. The edge layer may represent an outermost boundary between the exhaust gas flow and the walls of the flexible line segment, however it may also represent a relatively wide, expanded edge layer, which surrounds a central portion of the gas flow of the exhaust. This is based on the acknowledgement that only the portions of the exhaust gas flow near the wall entrain any urea or urea derivatives which are critical with regards to the precipitations to be avoided.

The present invention is based on the fundamental acknowledgement that excess urea or urea derivatives removed from an edge layer of the exhaust gas flow via a precipitation device upstream in reference to the flexible line segment and/or its parts essential for flexibility cannot any longer precipitate at the metallic bellows or other flexible parts. Within the scope of the present invention it is therefore not attempted to avoid any precipitation of urea derivatives in the flexible pipe element in any case, for example by an expensive improved urea injection or additional heating or the like, rather precipitations of urea derivatives which cannot be avoided without any considerable additional expense are relocated to a place upstream in reference to the flexible line segment or at least upstream in reference to those parts of the flexible pipe element which form its flexible section during operation.

Therefore the precipitation device according to the invention represents a type of urea trap. Within the scope of the present invention it may be embodied in the most different fashions. These different embodiments have in common, though, that urea derivatives from an edge layer of the exhaust gas flow or perhaps any already previously occurred precipitations of urea and urea derivatives, here including the viscous film of precipitations at the pipe walls, are trapped and deposited upstream in reference to the sections of the flexible pipe element which are flexible during operation, until they are dissolved again under better operating conditions of the internal combustion engine by then sufficiently hot exhaust gas flow or during a regeneration phase of a perhaps upstream arranged particle filter with appropriately high temperatures. Alternatively or additionally the precipitation device according to the invention can be embodied as a collection device for precipitations of urea derivatives. In this collection device then the precipitations, which cannot be dissolved any more, can accumulate permanently with the capacity of this collection device beneficially being selected such that all accumulated precipitations developing during the life span of the flexible pipe element can be collected, here.

One option to implement the precipitation device according to the invention is to provide an obstruction of flow for the edge layer of the exhaust gas flow in question. This obstruction of flow may represent an element penetrating at the edge into the exhaust gas flow, for example an impact sheet or a perforated sheet, which is directly or indirectly fastened annularly or in annular sections at the line segment arranged upstream in reference to the metallic bellows. The urea derivatives entrained in the respective edge layer of the exhaust gas flow preferably precipitate at such an obstruction of flow particularly when said obstruction of flow is provided with a flow tear-off edge. Even if no urea derivatives have formed yet but the edge layer of the exhaust gas flow in question is only oversaturated with urea, the latter will condense at an obstruction of flow such that no precipitations of derivatives can form any longer downstream in reference to the flexible section of the flexible pipe element.

Such an obstruction of flow may also be formed by a step in the line section arranged upstream in reference to the metallic bellows by which the interior diameter is increased or reduced. The embodiment of the obstruction of flow as a swirl element for the exhaust gas flow and/or its edge layers is also possible within the scope of the present invention.

Another option to implement the precipitation device according to the invention comprises to form it as a recess in the line section arranged upstream in reference to the metallic bellows, for example as a bead or a groove or one or more corrugations. Here it is particularly advantageous in turn for the recess being provided with a flow tear-off edge, at which due to the eddy effect not only the already formed urea derivatives entrained in the edge layer of the exhaust gas flow are centrifuged from an oversaturated edge layer of the exhaust gas flow but also excessive urea and thus it is also precipitated in the precipitation device.

Another option to realize the precipitation device according to the invention comprises to embody the precipitation device at least partially as a filter-like structure with a larger surface and/or with openings or channels to accept urea derivatives. Such a filter-like structure can be formed for example by at least one wire mesh ring or by at least one wire pad. Wire mesh rings or wire pads are advantageous such that they can easily be used in hot exhaust gas flow of an internal combustion engine and here no adverse material effects must be feared with regards to the metallic bellows of the flexible pipe element. The wire mesh ring and/or a wire pad already act as efficient urea traps according to the invention due to their large surface and their thermal effects (there are temperature differences between the volumes located inside the wire mesh ring and/or the wire pad and the exhaust gas flow).

The different ways of implementing the precipitation device according to the invention can be combined, if necessary, within the scope of the present invention. For example, a filter-like structure can be inserted in a recess in order to improve for example the feature of the precipitation device acting as a collection device. The filter-like structure may be used as an obstruction of flow or serve in cooperation with an impact sheet or the like for a secure retention of the urea derivatives until they are re-dissolved by the hot exhaust gas flow.

Finally, the precipitation device according to the invention can be implemented by a temperature reducer, thus by a section positioned upstream in reference to the section of the flexible pipe element flexible during operation which shows a lower temperature in reference to other parts flown through. This also results in the desired urea trap, because here urea derivatives preferably precipitate, which are either already entrained by the exhaust gas flow or which form from the urea of the oversaturated edge sections of the exhaust gas flow on site. In the simplest case this is realized by elements, such as a wire pad, acting in a thermal insulating fashion; however a section upstream in reference to the metallic bellows or for example a first section of the metallic bellows essentially not flexible, may actively be cooled in order to yield the desired effect.

BRIEF DESCRIPTION OF THE DRAWINGS

Several exemplary embodiments for a flexible line segment embodied according to the invention are shown in the attached drawings and are described in the following. Shown are.

DETAILED DESCRIPTION OF THE PREFERRED EMBODIMENT

Figure 1:
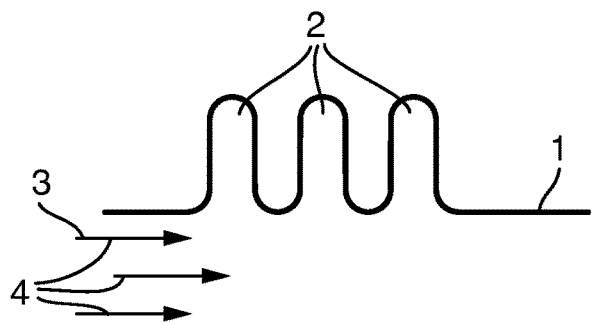
FIG. 1 is a schematic, lateral cross-section of a first embodiment of a precipitation device.

FIG. 1 shows a schematic, lateral cross-section of a first embodiment for a precipitation device embodied according to the invention. This represents a short, annularly corrugated metallic bellows with three corrugations and high stiffness, which forms the line section 1 arranged upstream in reference to the flexible pipe element of the actual metallic bellows (not shown here). The three corrugations form the recesses 2 used as the precipitation device within the scope of the present invention, which due to eddy effects and a thermal effect (the corrugations are cooler than the adjacent tubular walls the hot exhaust gas flows through) serve as a urea trap, thus they collect urea derivatives and excess urea from the edge layer 3 of the exhaust gas flow 4. The precipitations of urea derivatives developing here collect inside the corrugations 2. They have a volume allowing collection of all precipitations of urea derivatives developing during the life span of the flexible pipe element. Therefore the corrugations 2 simultaneously serve as a collection device for precipitations of urea derivatives.

Figure 2:
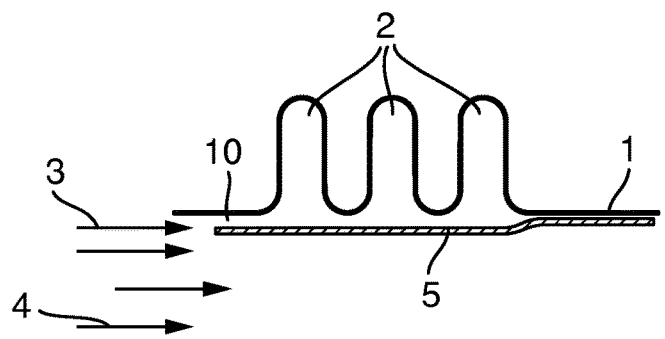
FIG. 2 is a lateral, schematic cross-section of another embodiment of a precipitation device.

FIG. 2 shows another exemplary embodiment, which is modified in reference to FIG. 1 only such that a cylindrical, smooth tube 5 is arranged coaxially inside the corrugated line section 1. Downstream in reference to the three corrugations 2 it contacts the line section 1 and is here fastened thereat (at the right side in FIG. 2) while upstream it has a smaller diameter and accordingly a free end (shown at the left in FIG. 2), which is not in any contact with the line section 1. Accordingly an annular chamber 10 forms between the free end of the smooth tube 5 and the line section 1, into which the edge layer 3 in question of the exhaust gas flow 4 flows and/or eddies so that here the urea derivatives are precipitated and collected and/or deposited inside the corrugations 2. For the purpose of allowing flow the smooth tube 5 may be embodied as a perforated sheet metal.

Figure 3:
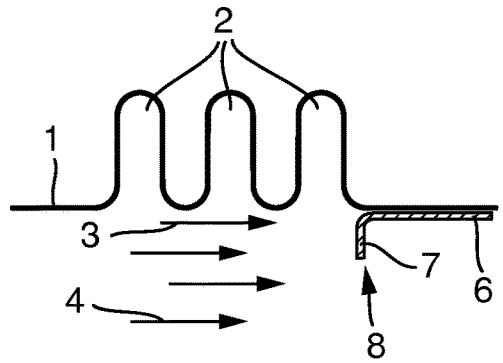
FIG. 3 is a schematic, lateral cross-section of another embodiment of the precipitation device.

FIG. 3 also shows a line section 1 which, similar to FIG. 1, is embodied as a short, stiff, and annular, corrugated metallic bellows with three corrugations. Here, downstream in reference to the corrugations 2 an obstruction of flow 6 is provided, namely a radially folded impact sheet 7 projecting at the edge into the exhaust gas flow 4, showing a flow tear-off edge 8.

Figure 4:
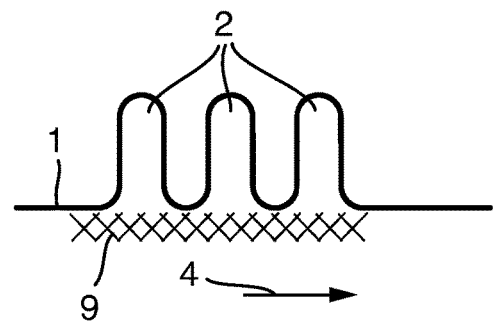
FIG. 4 is a schematic, lateral cross-section of another embodiment of the precipitation device.

FIG. 4 shows an exemplary embodiment, which in turn is similar to the exemplary embodiment shown in FIG. 1, with here additionally a wire mesh ring 9 being provided, which covers the corrugations 2 of the corrugated line section 1 towards the inside. Here, the wire mesh ring 9 acts on the one hand as an obstruction of flow for the edge layer of the exhaust gas flow, because the obstruction of flow is considerably higher along its surface than in the adjacent line sections. Furthermore the wire mesh ring 9 thermally shields the interior sections of the corrugations 2 from the hot exhaust gas flow 4 such that by the additional cooling effect of the corrugations 2 the wire mesh ring 9 ultimately has a lower temperature than the adjacent line sections of the line segment. This also promotes the precipitation of urea derivatives, which due to the capillary effects pass through the wire mesh ring 9 into the interior space of the corrugations 2 and are here permanently deposited.

Figure 5:
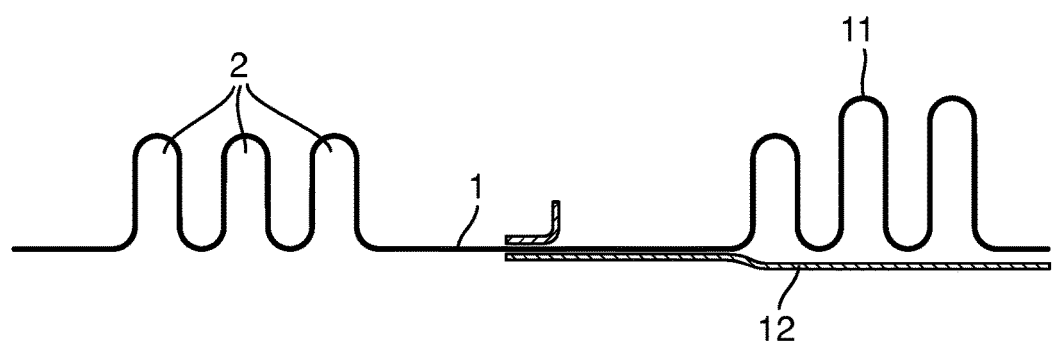
FIG. 5 is a schematic, lateral cross-section of another embodiment of the precipitation device.

FIG. 5 shows in a schematic illustration a flexible pipe element with a metallic bellows 11 and the line section 1 arranged upstream in reference thereof, with this line segment 1 according to the exemplary embodiment shown in FIG. 1 being embodied for a precipitation device according to the invention, i.e. as a short, annularly corrugated metallic bellows with three corrugations 2 and high stiffness, serving as a urea trap. A metallic tube 12 is fastened at the line section 1 towards the actual metallic bellows 11, which protects the corrugations of the metallic bellows 11 from the hot exhaust gas flow 4 and guides the exhaust gas flow 4 such that any eddies at the corrugations of the metallic bellows 11 are prevented.

Figure 6:
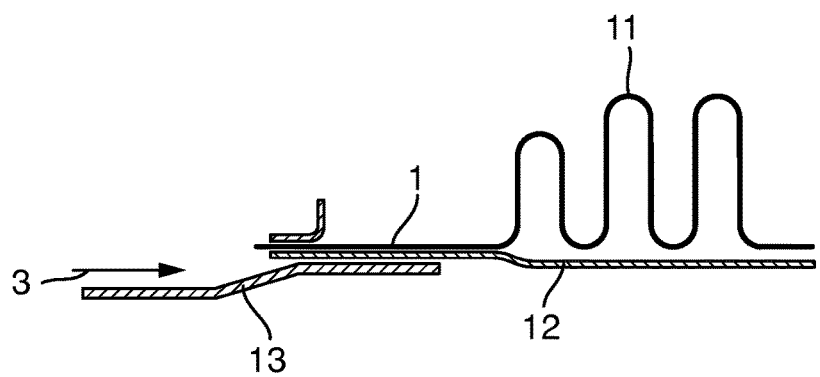
FIG. 6 is a schematic, lateral cross-section of another embodiment of the precipitation device.

FIG. 6 shows another embodiment of the flexible pipe element embodied according to the invention with a metallic bellows 11 and a line section 1, with the metallic bellows 11 here once more being protected by a metallic tube 12. The precipitating device is provided at the otherwise cylindrical smooth tube forming the line section 1 as a type of "inverse" flue, thus a tube section 13 conically tapering at the upstream side, which is made from a perforated sheet metal and thus exhaust gas 4 can flow through it. The edge section 3 of the exhaust gas flow 4 in question reaches the area between the wall of the line section 1 and the tube section 13, which therefore act here as an obstruction of flow, causing the urea derivatives and oversaturated urea to be precipitated. This solution is suitable for installation situations in which the urea derivatives precipitated at the tube section 13 can be re-dissolved from time to time by way of regeneration.

Figure 7:
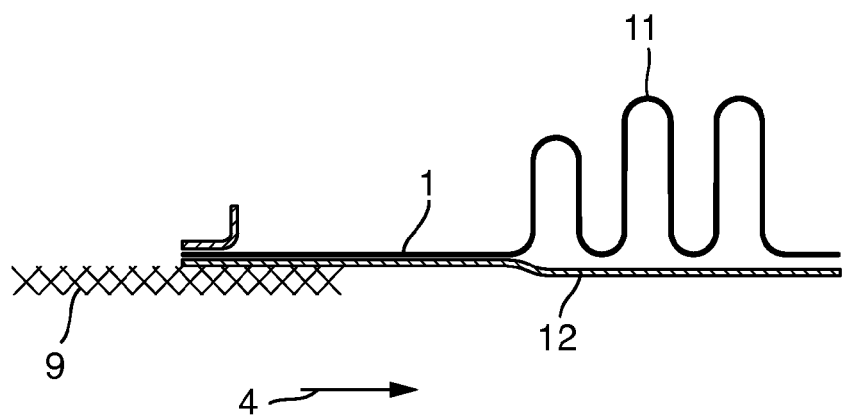
FIG. 7 is a schematic, lateral cross-section of another embodiment of the precipitation device.

FIG. 7 shows a variation of the exemplary embodiment shown in FIG. 6. Instead of a conically shaped tube section 13 here a wire mesh ring 9 is fastened at the wall of the line section 1, which precipitates oversaturated urea and urea derivatives from the edge layer 3 of the exhaust gas flow 4 before it can reach the metallic tube 12 or even the metallic bellows 11.

Figure 8:
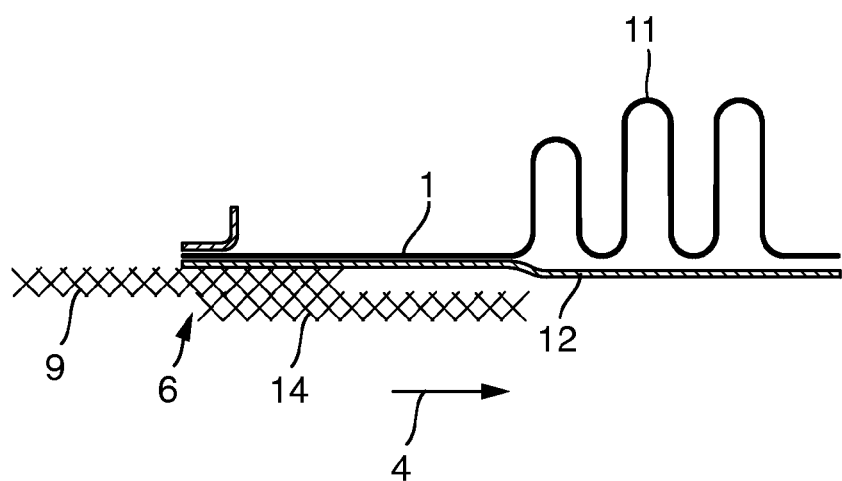
FIG. 8 is a schematic, lateral cross-section of another embodiment of the precipitation device.

Another variation is shown in FIG. 8: In addition to the wire mesh ring 9 provided in the exemplary embodiment according to FIG. 7 a second wire mesh ring 14 is provided, which forms a step at the first wire mesh ring 9 and by this additional obstruction of flow 6 an even more efficient precipitation of urea derivatives is ensured.

Figure 9:
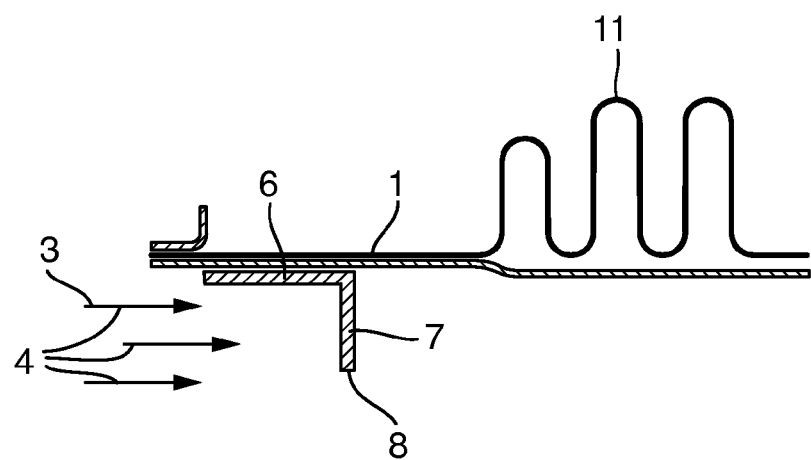
FIG. 9 is a schematic, lateral cross-section of another embodiment of the precipitation device.

FIG. 9 shows another variation of the precipitation device according to the invention: Here, an impact sheet 7 with a flow tear-off edge 8 is arranged at the line section 1 arranged upstream in reference to the metallic bellows 11. Thus, this represents a radially inwardly canted ring, which forms an obstruction of flow 6 for the edge layer 3 of the exhaust gas flow 4 in question. The urea derivatives are precipitated at the impact sheet 7, with this particularly being the case due to the flow tear-off edge 8 at the downstream side of the impact sheet 7. Accordingly the urea derivatives collect in the "shadow" of the impact sheet 7 and can perhaps here be removed again by way of regeneration.

Figure 10:
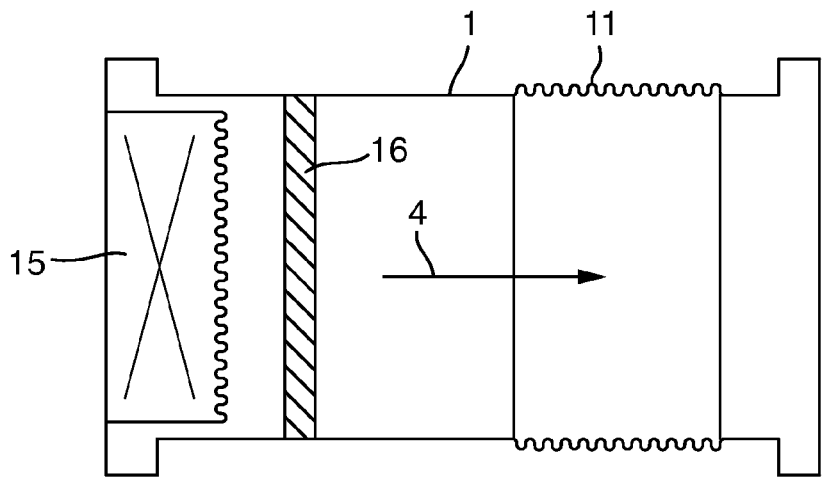
FIG. 10 is a schematic, lateral cross-section of another embodiment of the precipitation device.

FIG. 10 shows a variation of the exemplary embodiment already illustrated in FIG. 9. At the line section 1 arranged between the metallic bellows 11 and an injection 15 of urea occurring upstream an annular perforated sheet 16 or a wire mesh is provided as an obstruction of flow 6 for the edge layer 3 of the exhaust gas flow 4. This perforated sheet 16 or the wire mesh forms the urea trap according to the invention; here the urea derivatives and the perhaps oversaturated urea in the edge layer 3 of the exhaust gas flow 4 precipitate as urea derivatives. These precipitations of urea derivatives can be dissolved by way of regeneration via hot exhaust gas flow.

Figure 11:
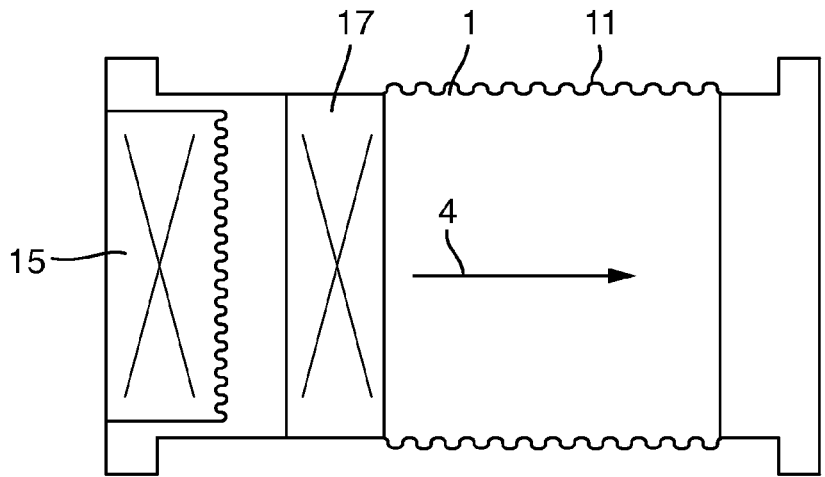
FIG. 11 is a schematic, lateral cross-section of another embodiment of the precipitation device.

A variation of the exemplary embodiment shown in FIG. 10 is illustrated in FIG. 11: Instead of the perforated sheet metal 16 provided in FIG. 10 here a swirl element 17 is indicated as an obstruction of flow 6. This swirl element 17 causes the edge layer 3 of the exhaust gas flow 4 in question to rotate about a central axis of the line segment so that any entrained urea derivatives and oversaturated urea remaining in the line section 1 precipitate before reaching the metallic bellows 11.

Figure 12:
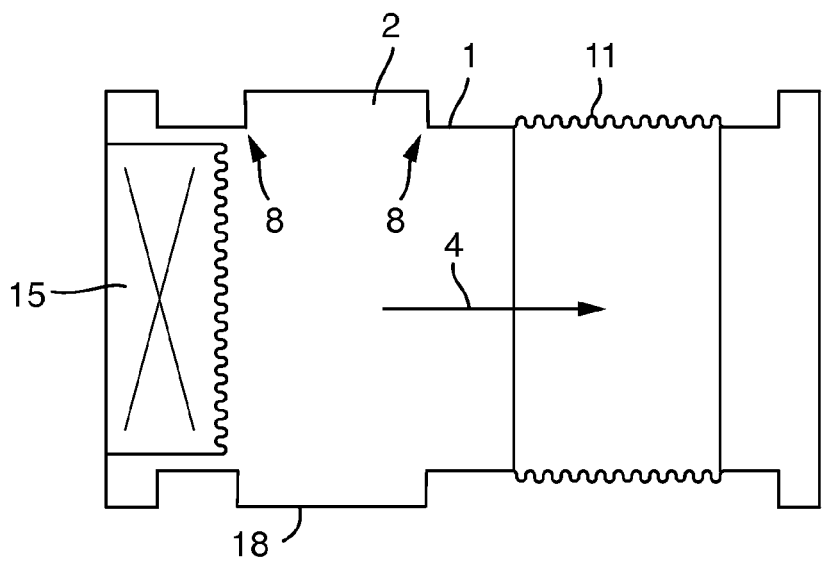
FIG. 12 is a schematic, lateral cross-section of another embodiment of the precipitation device.

FIG. 12 finally shows an exemplary embodiment in which the precipitation device according to the invention is formed by a recess 2 in the form of a bead 18 in the line section 1 between the injection 15 and the metallic bellows 11. This bead 18 is intentionally provided with flow tear-off edges 8, at which the urea derivatives precipitate so that they can accumulated within this bead. The bead 18 can for example additionally be coated with a wire pad (not shown) so that any urea derivatives precipitated in the bead 18 can be permanently deposited, here.

All exemplary embodiments have in common that the precipitation devices are not required to be embodied rotationally symmetrical about the axis of this line segment. Rather, they may also be arranged in sections, for example placed distributed over the perimeter.

The invention claimed is:

1. A flexible pipe element for the exhaust system of an internal combustion engine comprising: an annularly corrugated or helically corrugated metallic bellows (11) adapted for a flow of exhaust gas (4) therethrough, a line section (1) arranged upstream in reference to the metallic bellows (11), at least one precipitation device (2, 5, 6, 7, 9, 13, 14, 16, 17, 18) for precipitating urea derivatives out from an edge layer (3) of the exhaust gas flow (4) or for precipitating urea that is entrained in an oversaturated edge layer (3) of said exhaust gas flow (4), or both, arranged upstream in reference to the metallic bellow (11), wherein the precipitation device comprises a solid annular flow obstruction (6) having an inner diameter and having a clear open cross-section extending across an entirety of the inner diameter of the solid annular flow obstruction.

2. The flexible pipe element according to claim 1, further comprising a collection device for precipitations of the urea derivatives.

3. The flexible pipe element according to claim 2, wherein the precipitation device comprises the collection device for precipitations of the urea derivatives.

4. The flexible pipe element according to claim 1, wherein the flow obstruction (6) is embodied as an element projecting into the edge layer of the exhaust gas flow (4).

5. The flexible pipe element according to claim 4, wherein the flow obstruction (6) comprises an impact sheet (7).

6. The flexible pipe element according to claim 5, wherein the precipitation device comprises a recess (2) in the line section (1) arranged upstream in reference to the metallic bellows (11).

7. The flexible pipe element according to claim 6, wherein the precipitation device comprises a groove or a corrugation.

8. The flexible pipe element according to claim 7, wherein the flow obstruction (6) or the recess (2) is provided with at least one flow tear-off edge (8).

9. The flexible pipe element according to claim 1, wherein the precipitation device comprises a filter structure with at least one of a large surface or with openings or channels to accept the urea and urea derivatives.

10. The flexible pipe element according to claim 9, wherein the filter structure is formed by at least one wire mesh ring (9) or at least one wire pad.

11. The flexible pipe element according to claim 7, wherein at least one of the flow obstruction (6) or the recess (2) are combined with a filter structure (9).

12. The flexible pipe element according to claim 1, wherein the precipitation device is adapted to form a section with the line section (1) having a lower temperature in reference to a temperature of the metallic bellows (11).

13. The flexible pipe element of claim 1, wherein the at least one precipitation device is arranged around an inner circumference of the line section and extends only partially into a through flow area of the line section.

14. A flexible pipe element for the exhaust system of an internal combustion engine comprising: an annularly corrugated or helically corrugated metallic bellows (11) adapted for a flow of exhaust gas (4) therethrough, a line section (1) arranged upstream in reference to the metallic bellows (11), at least one precipitation device (2, 5, 6, 7, 9, 13, 14, 16, 17, 18) for precipitating urea derivatives out from an edge layer (3) of the exhaust gas flow (4) or for precipitating urea that is entrained in an oversaturated edge layer (3) of said exhaust gas flow (4), or both, arranged upstream in reference to the metallic bellow (11), wherein the precipitation device comprises an annular flow obstruction (6) formed by a mesh ring or perforated ring with a material of the mesh ring or the perforated ring extending radially inwardly by a first distance from an outer wall of the line section only partially into a cross-sectional area of the line section to define an inner diameter of the annular flow obstruction, and a clear open cross-section extends across an entirety of the inner diameter of the annular flow obstruction, the clear open cross-section having a diameter that is greater than the first distance.

* * * * *